(12) United States Patent
Zaydman

(10) Patent No.: US 10,671,324 B2
(45) Date of Patent: Jun. 2, 2020

(54) LOCATING GRAINS IN STORAGE USING GRAIN TABLE TO GRAIN-RANGE TABLE COMPRESSION

(71) Applicant: VMWARE, INC., Palo Alto, CA (US)

(72) Inventor: Oleg Zaydman, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 40 days.

(21) Appl. No.: 15/877,584

(22) Filed: Jan. 23, 2018

(65) Prior Publication Data

US 2019/0227752 A1 Jul. 25, 2019

(51) Int. Cl.
*G06F 3/06* (2006.01)
*G06F 9/455* (2018.01)

(52) U.S. Cl.
CPC .......... *G06F 3/0664* (2013.01); *G06F 3/061* (2013.01); *G06F 3/067* (2013.01); *G06F 9/45558* (2013.01); *G06F 2009/4557* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 7,251,663 | B1 * | 7/2007 | Smith | G06F 12/10 |
| 7,366,743 | B2 * | 4/2008 | Sawadsky | G06F 16/275 |
| 8,024,545 | B2 * | 9/2011 | Kim | G06F 12/0246 711/103 |
| 8,683,156 | B2 * | 3/2014 | Bahadure | G06F 3/0605 711/162 |
| 8,904,081 | B1 * | 12/2014 | Kulkarni | G06F 3/065 711/6 |
| 9,164,686 | B2 | 10/2015 | Lubbers et al. | |
| 9,229,854 | B1 * | 1/2016 | Kuzmin | G06F 8/654 |
| 9,367,244 | B2 | 6/2016 | Kulkarni | |
| 9,558,121 | B2 * | 1/2017 | Zei | G06F 12/0846 |
| 9,645,767 | B2 * | 5/2017 | Lubbers | G06F 3/061 |
| 10,254,996 | B1 * | 4/2019 | Jain | G06F 3/0647 |
| 2009/0006740 | A1 * | 1/2009 | Lubbers | G06F 3/0613 711/114 |
| 2010/0235831 | A1 * | 9/2010 | Dittmer | G06F 9/45558 718/1 |
| 2010/0299339 | A1 * | 11/2010 | Kementsietsidis | G06F 16/22 707/759 |

(Continued)

*Primary Examiner* — Abu Zar Ghaffari
(74) *Attorney, Agent, or Firm* — Fish & Richardson P.C.

(57) ABSTRACT

A "grain" is a unit of space allocation in a virtual disk. Grains are represented in physical storage only when used, that is, when they contain data. Grains may be located in storage using an in-memory grain-range table. The grain-range table is derived from a grain table in storage. A grain-range table includes entries for the starting grains of incrementing and or decrementing ranges; grain-table entries that do not start a range are omitted in the grain-range table. Accordingly, a grain-range table can serve as a compressed form of a grain table. This compression makes it feasible to store large numbers of grain-range tables in memory in cases where it would not be feasible to store the corresponding grain tables in memory. As a result, one rather than two storage accesses are require per storage access request, resulting in a substantial performance improvement.

18 Claims, 6 Drawing Sheets

(56) References Cited

U.S. PATENT DOCUMENTS

| | | |
|---|---|---|
| 2012/0167080 A1 | 6/2012 | Vilayannur et al. |
| 2013/0036418 A1 | 2/2013 | Yadappanavar et al. |
| 2013/0151802 A1 | 6/2013 | Bahadure et al. |
| 2014/0032850 A1 | 7/2014 | Phelan et al. |
| 2016/0062954 A1* | 3/2016 | Ruff .................. G06F 17/21 715/249 |
| 2016/0232187 A1* | 8/2016 | Aoki ............. G06F 16/90348 |
| 2017/0008162 A1* | 1/2017 | Tsubota ............. G05B 19/00 |
| 2018/0011885 A1* | 1/2018 | Prahlad ............ G06F 11/1453 |
| 2019/0095244 A1* | 3/2019 | Eda .................. G06F 9/4881 |

\* cited by examiner

LOCATING GRAINS IN STORAGE USING GRAIN TABLE TO GRAIN-RANGE TABLE COMPRESSION

BACKGROUND

Virtual storage disks can be allocated to virtual machines running on a hypervisor. So that the total capacity of the virtual hard disks is not limited to the capacity of the storage managed by the hypervisor, each hard disk can be logically divided into grains, within only those grains that are being used to store data being allocated space on physical storage media. Herein, a "grain" unit of space allocation in a virtual disk, typically comprising more than one cluster. A "cluster" is the smallest unit of data that can be loaded or stored to storage by an operating system. A grain table is stored on the physical storage for each virtual disk. A typical grain table is an array of offsets that point to individual grains.

To load or store data from or to a grain, one must first read the grain's offset from the grain table and then read data at that offset. However, this requires twice as many costly disk reads as would be required if the data could be read directly. To achieve better performance, a grain table can be kept in memory. However, each grain table can consume megabytes. For a hypervisor managing a large number of virtual disks, holding all grain tables in memory might conflict with the production demands of the virtual machines. Accordingly, what is needed is a more performant approach to managing grain-table data.

DETAILED DESCRIPTION

The present invention provides for locating grains in storage using in-memory grain-range tables, as opposed to using on-storage grain tables or in-memory copies of grain tables to locate grains in storage. Where a grain table stores an entry for each grain, a grain-range table stores an entry for each grain range. Herein, a grain-range is a sequence of consecutive grains for which the associated offsets vary linearly with the associated grain indexes and for which the offsets of grains that are adjacent in the sequence differ by one grain. As grain ranges can be hundreds of grains long, there are many situations in which it is feasible to store a full set of grain-range tables in memory but in which it is not feasible to store their grain-table counterparts.

Thus, using in-memory grain-range tables can avoid the time-consuming, performance-sapping storage accesses required to locate grains in storage. That is, only one storage access instead of two is required to fulfill a storage access (load or store) request. The net effect is a significant performance improvement. Furthermore, conversion of a grain-table to a grain-range table can substantially reduce the bandwidth required to transfer a grain table over a network.

Figure 1:
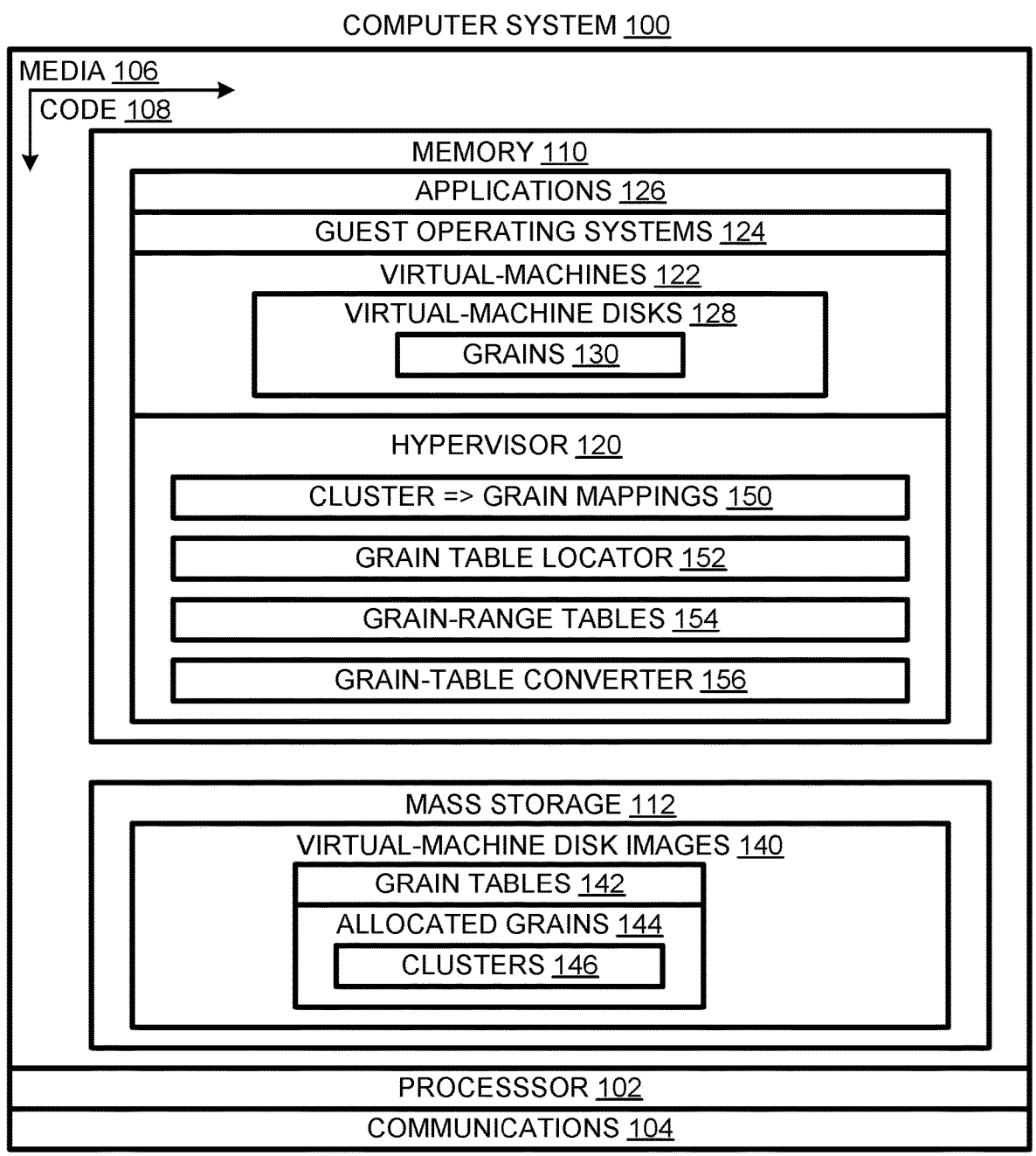
FIG. 1 is a schematic diagram of a computer system that includes in-memory grain-range tables for locating grains in storage.

A computer system 100, shown in FIG. 1, includes a processor 102, communications devices 104, and non-transitory media 106. Non-transitory media 106 is encoded with code 108 defining much of the functionality described herein. Media 106 includes relatively fast and relatively small capacity memory 110 and relatively slow and relatively capacious storage 112. For example, memory 100 can include random-access memory (RAM), while storage media 112 can include hard disks and so-called solid-state disks (SSDs). Communications devices 104 can include: 1) input/output devices (keyboards, displays) and interfaces therefor; and network interface devices such as network-interface cards and host-bus adapters.

Memory 110 includes a hypervisor 120 that hosts virtual machines 122. In an alternate embodiment, the hypervisor hosts application containers. Each virtual-machine hosts a respective guest operating system 124. Each guest operating system 124 can host one or more application programs 126. Each virtual machine 122 can be provisioned with one or more virtual-machine disks 128. At least some of virtual-machine disks 128 may be provisioned as "sparse", in which case, hypervisor 120 treats them as divided into grains 130, each grain containing a configurable number, e.g., 16, clusters. Herein, a "cluster" is the small unit of data that is accessible from storage, e.g., by a guest operating system.

A grain may or may not contain one or more clusters of data. A grain that includes at least one non-empty cluster is allocated to physical storage 112. Each virtual-machine disk has a corresponding virtual-machine disk image 140 in storage. Each virtual-machine disk image of a "sparse" virtual-machine disk has a grain table 142. Each sparse virtual machine disk on which some data has been stored has at least one allocated grain 144 appended to the grain table. Each allocated grain 144 has at least one cluster 146 contained therein.

When an application program 128 requests to read or write data, the host guest operating system 124, if the data is not represented in faster memory, issues a load/store request directed at one of its virtual disks 128 for a cluster that contains or will contain the data specified in the request. Hypervisor 120 recognizes which grain 130 contains the cluster using a cluster-to-grain mapping 150. The location in storage of the grain table for the grain can be found using a grain-table locator 152.

Assuming the grain 130 has been allocated so that it can be found among allocated grains 144, the location of the allocated grain 144 relative to its grain table 142 could be found by looking up the grain in the respective grain table. However, this would require an extra storage access. To avoid this extra disk access, the location of the grain relative to its grain table can be determined from an in-memory grain-range table 154. Grain-range tables 154 can be derived from respective grain tables 142 using a grain-table converter 156.

Figure 2:
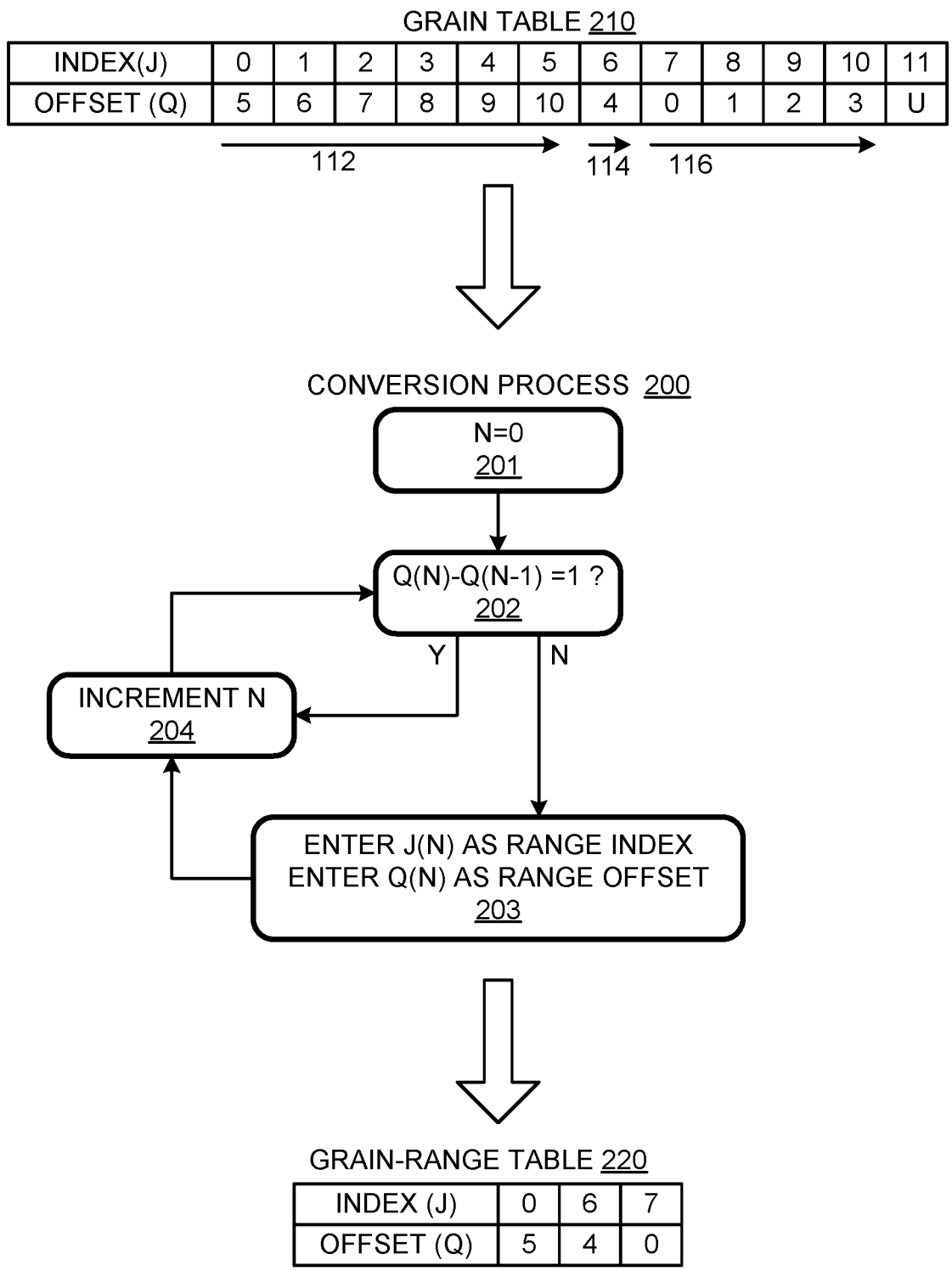
FIG. 2 is a flow diagram for converting a grain table with incrementing ranges to a grain-range table.

A process 200, flow charted in FIG. 2, provides for converting a grain table, e.g., grain table 210 to a grain-range table, e.g., grain-range table 220. Each grain of a spare virtual disk is assigned an index according to its order on the virtual disk. Thus, the virtual disk characterized by grain table 210 includes 12 grains: grain index 0 to grain index 11. (In practice, a typical grain table would represent hundreds of thousands of grains.) However, the order in which these grains were allocated to physical storage is not the same as their respective order on the virtual disk. The order of allocation is (by grain index) 7, 8, 9, 10, 6, 0, 1, 2, 3, 4 and 5. Grain index 11 has not been allocated. Accordingly, the offsets are 0, 1, 2, 3, 4, 5, 6, 7, 8, 9, and 10, respectively, with grain index 11 being shown as unallocated (U) so that it does not consume physical storage capacity. The result is shown for grain-table 210.

Allocated grains 0-5 have offsets 5-10, respectively. Thus, grains 0-5 constitute an incrementing (forward) 6-grain range 112. Grain 6 is not in sequence with any other grain, but it is regarded herein as in a 1-grain incrementing range 114 for purposes here. Grains 7-10 are in an incrementing 4-grain range 116.

Thus, grain table 210, as shown, comprises three sequences 112, 114, and 116. Each of these sequences has a start grain, grain 0 at offset 5, grain 6 at offset 4, and grain 7 at offset 0. These three start grains are the entries for grain-range table 220. So in the illustrated example, a 12:3 (4:1) compression has been achieved (with no loss of information). In practice, grain-table sequences can be hundreds of grains long, resulting in commensurate size reductions when converted to grain-range tables.

Conversion process 200 is an example of a process by which grain-range table 220 can be derived from grain table 210. Process 200 is an iterative process, with each allocated grain being handled in a respective iteration. At 201, a grain index is set to zero. At 202, a determination is made whether or not $Q(N)-Q(N-1)=1$, where $Q(N)$ is the offset for the Nth grain. In other words, the question is whether the offset for the Nth grain is or is not one greater than the offset for the previous $(N-1)^{st}$ grain. In the first iteration, with N=0, there is no $N-1^{st}$ grain, so the answer is "no". The answer is also "no" if the Nth grain is not in the same sequence as the $(N-1)^{st}$ grain, for $N\geq 1$.

In the event that the Nth grain is not in sequence with the $(N-1)^{st}$ grain, that is, $Q(N)-Q(N-1)\neq 1$, then process 200 proceeds to action 203. At 203, $J(N)=N$ is entered in the first (leftmost) available grain-range table index location, and the offset $Q(N)$ is entered in association with the index. For example, in grain-range table 220, for grain 0, the index J is zero and the offset Q is 5, as it is in grain table 210. From action 203, process 200 proceeds to action 204, at which N is incremented, e.g., from 0 to 1.

In the event that the Nth grain is in sequence with the $(N-1)^{st}$ grain, that is, $Q(N)-Q(N-1)=1$, process 200 proceeds from action 202 to action 104. For example, for N=1, $Q(N)=6$ and $Q(N-1)=5$, so $Q(N)-Q(N-1)=1$ reduces to 6-5, which does equal unity. Thus, entering action 103 is skipped, and N is incremented, e.g., from 1 to 2, at 204. Apply process 100 thusly to grain table 210, yields grain-range table 220.

Process 100 compresses incrementing ranges but not reverse ranges. For example, a guest operating system may start a file near the beginning of a virtual disk and then grow the file toward the end grains. Concurrently, the guest operating system may start another file near the end of a virtual disk and allow it to grow toward the front. The two files will not reach each other until the virtual disk is full or nearly full. Thus, there may be little or need for defragmentation of the virtual disk. However, it would be helpful to treat compress the decrementing range in addition to the incrementing range.

Figure 3:
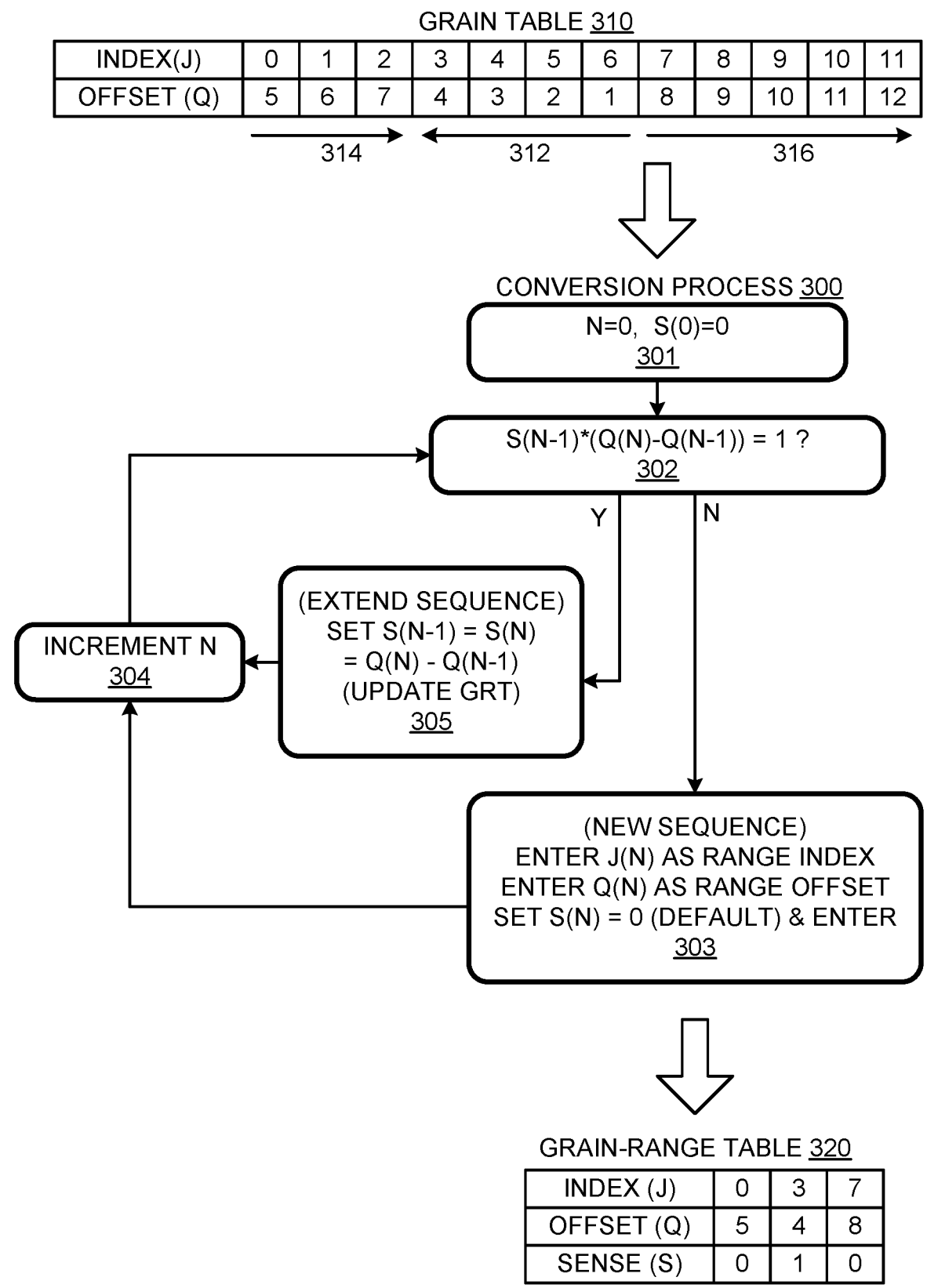
FIG. 3 is a flow diagram for converting a grain table with incrementing and decrementing ranges to a grain-range table.

A process 300, FIG. 3, provides for converting a grain table 310 to a grain-range table 320 such that a reverse sequence 312 of grain table 310 is compressed along with forward sequences 314 and 316. Grain-range table 320 differs from grain-range table 220 (FIG. 2) in that each entry includes not only an index value J and an offset value Q, but also a direction value S that represents the direction, i.e., direction, of the respective sequence. In FIG. 3, the direction can be incrementing (0) or decrementing (1), aka "reverse". The direction indication for a range can be a one-bit value, e.g., 0 implies incrementing and 1 implies decrementing.

At 301, iterative grain index N is set initially to 0, representing the first grain in grain table 310, while D(0) is initialized to the default value zero, corresponding to an incrementing range. The default setting of the direction arbitrarily interprets single-grain sequences as incrementing ranges.

At 302, a determination is made whether or not the current grain is in the same sequence as the immediately previous grain; in other words, does $D(N-1)*(Q(N)-Q(N-1))=1$ ?. In the first iteration, N=0 and $Q(N-1)$ is undefined, so the answer is no. For $N\geq 2$, a "no" answer means that the current grain is not in the sequence including the immediately preceding grain. For example, grain 3, which has an offset of 4, is not in the same sequence as grain 2, which has an offset of 7.

In the event that, at 302, it is determined that the current grain is not in sequence with the previous grain, then a new range is identified. In that case, at 303, the current grain index is entered into the first (leftmost) column of grain-range table 330, the associated offset $Q(N)$ is entered as the associated offset, and the direction is set by default to zero. Then, at 304, N is incremented and process 300 returns to action 303 for the next grain.

In the event that, at 302, it is determined that the current grain is in sequence with the immediately preceding grain, then, at 305, the sequence is extended with the current grain. If the immediately preceding grain is in a multi-grain (two or more grains) sequence, then the sequence is simply extended. If the immediately preceding grain is in a one-grain sequence, then the sequence becomes a two-grain sequence, the direction of which depends on whether $Q(N)$ is one less than or one more than $Q(N-1)$. If $Q(N)$ is one more than $Q(N-1)$ then the sequence is a forward sequence. In that case, $D(N-1)$ remains at zero and $D(N)$ is set to zero. If $Q(N)$ is one less than $Q(N-1)$, then $D(N)$ is set to unity and $D(N-1)$, which was previously set to zero is reset to unity. In short, at 305, the values are set at $D(N-1)=D(N)=Q(N)-Q(N-1)$, with the update to $Q(N-1)$ being entered into grain-range table 320. Then the iteration index is incremented, and process 200 returns to 302 until there are no more allocated grains to process. The end result is a compression of both forward and reverse sequences in the grain table.

Figure 4:
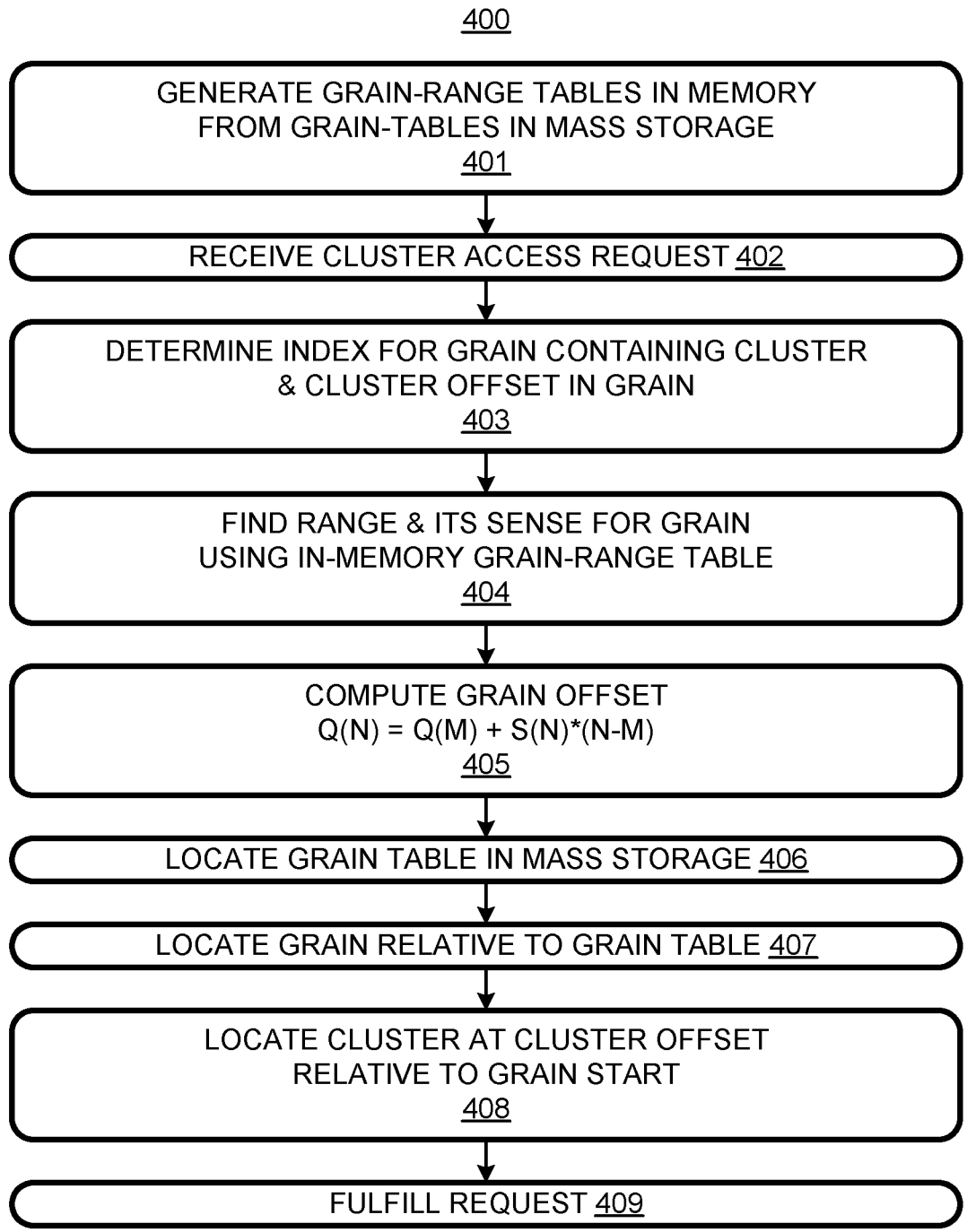
FIG. 4 is a flow chart of a process for locating a cluster in storage using an in-memory grain-range-table.

A hypervisor-implemented storage access request handling process 400 is flow-charted in FIG. 4. At 401, one or more grain-range tables are generated (and stored in memory) from grain tables stored in storage. Note that, whenever a grain is allocated to physical storage, a grain table is updated. Thus, the corresponding grain-range table can be regenerated or else updated directly.

At 402, a cluster access request is received, e.g., by a hypervisor from a guest operating system. At 403, a grain index for a target grain containing the requested cluster or cluster location is determined. Since the virtual disk in which the cluster is to be found has been divided into grains, it is simply a matter of checking a grain to cluster mapping. In addition, a cluster offset of the cluster within the target grain is determined.

At 404, the grain-range table for the virtual disk is read to determine the range containing the target grain. In addition, the direction of the range, incrementing or decrementing, is determined from the grain-range table if the grain-range table provides for both directions. At 405, a grain offset is computed from offset data in the grain-range table as Q(N) =Q(M)+D(N)(N−M), where N is the index of the target grain and M is the index of the start grain for the range containing the target grain.

At 406, the grain table is located in storage, e.g., using a grain-table locator. At 407, the target grain is located relative to the grain table based on its offset determined at 405. At 408, the target cluster is located within the target grain based on its cluster offset determined at 403. At 409, the cluster request is fulfilled, e.g., by loading the cluster or storing to the cluster location.

Figure 5:
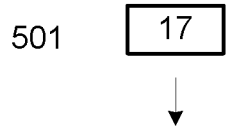
FIG. 5 is a flow diagram for using a binary search to determine a grain offset using a grain-range table.

Action 404, which involves identifying the range that contains a target grain, can involve a binary search, as flow charted in FIG. 5. At 501, a grain index, e.g., 17, for a target grain is received and compared, at 502, to the range start nearest the middle of the grain-range table. If there is an even number of ranges, the range just above the middle is selected. In this case, the range start 38 is selected. Since 17 is less than 38, the lower half of the table is selected at 502 for the next stage of the search. At 503, the incoming grain index (17) is compared to the middle index (14) for the selected half of the grain table. In this case, 17 is greater than 14, so the second quarter of the grain table is selected. At 504, the incoming grain index (17) is compared with the middle grain index (25). Since 17<25, the lower column (14) is selected, at 505, as the range including the index for the target grain.

Figure 6:
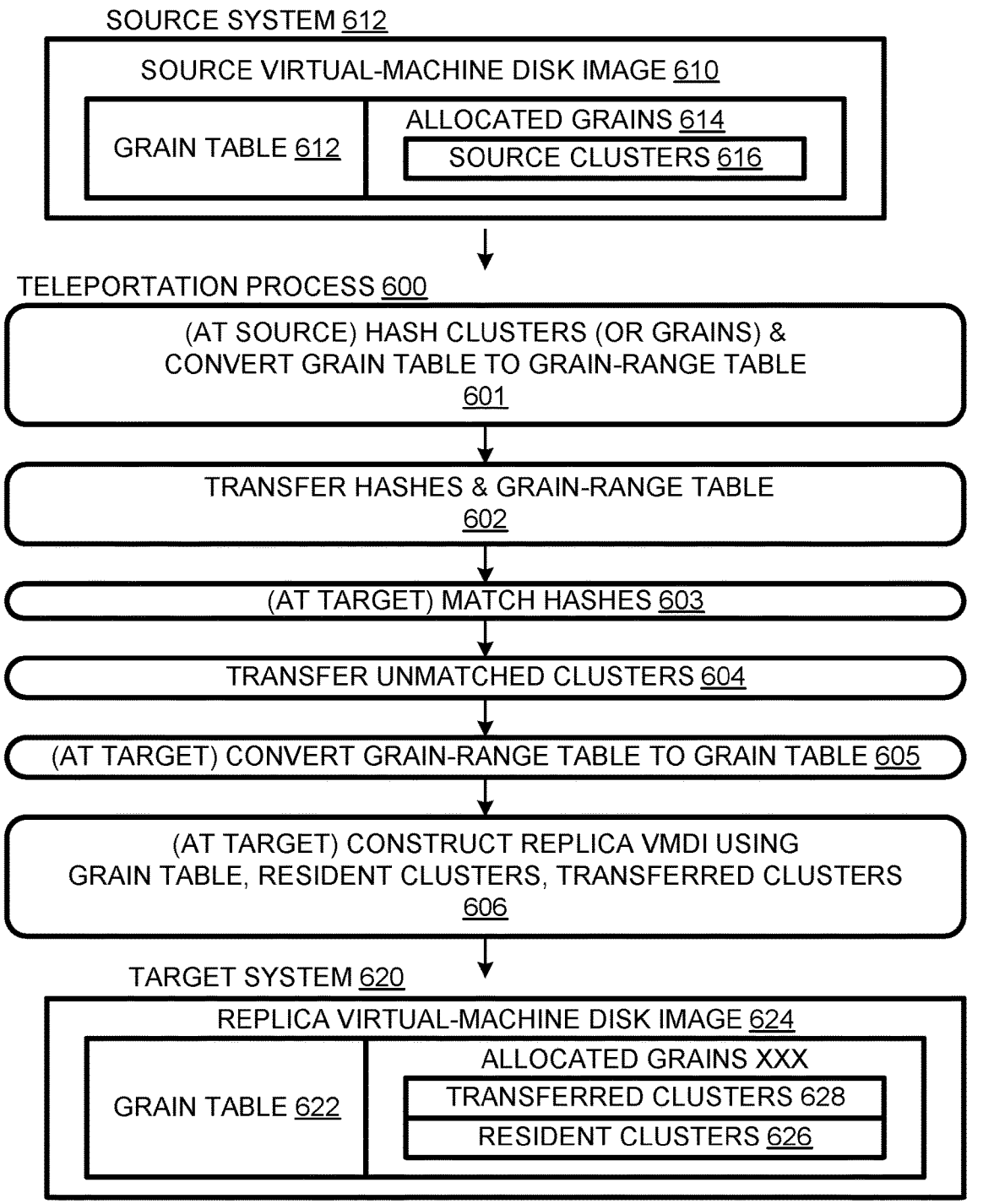
FIG. 6 is a flow diagram for a teleportation process in which a grain table is compressed for transfer by converting it to a grain-range table.

In addition to providing greater performance for sparsely provisioned virtual disks, grain-range tables can be used to reduce bandwidth requirements and accelerate transfers of grain tables. Accordingly, a transfer process 600, flow-charted in FIG. 6 provides for replicating, on a target system 620, a virtual-machine disk image (VMDI) 610 on a source system 612. Source VMDI 610 includes a grain table 614, allocated grains 616 appended to the grain table, and source clusters 616 arranged among the allocated grains.

At 601, hashes are generated from source clusters 616. In addition, grain table 612 is converted to a grain-range table as a form of compression. At 602, hashes and the grain-range table are transferred from source system 612 to target system 620. At 603, at target system 620, the hashes are compared to hashes of clusters already resident at the target system. A hash match indicates that there is a duplicate resident on the target system of a source cluster. The import is that resident clusters can be used instead of some source clusters, saving the bandwidth require to transfer the latter. At 604, unmatched source clusters are transferred from the source system to the target system. At 605, the grain-range table is converted, at the target system, to a grain table 622 equivalent to grain table 612. At 606, a replica 624 of VMDI 610 is constructed at the target system using grain table 622 generated at 605, resident clusters 626 found during 603, and transferred clusters transferred at 604. As a result, grains 630 of replica VMDI 624 are equivalent to allocated grains 614 of source VMDI 610. Note that bandwidth is saved since some clusters are not transferred and the transfer of the grain table required less bandwidth in its compressed form as a grain-range table. Herein, a transfer process in which a replica is built at least in part using clusters already resident on a target system can be referred to as a "teleportation" process. Note that, the invention provides for compressing grain tables into grain-range tables, e.g., when transferring virtual-machine disk images, whether or not teleportation is involved.

Herein, an "operating system" is system software that manages computer hardware and software resources and provides common services for computer applications and programs. Herein, a "guest operating system" is an operating system in which the so-called "computer hardware" is virtual, i.e., is emulated in software. Herein, a "hypervisor" is a virtualizing operating system, e.g., that supports virtual machines that can host guest operating systems or that can support application containers that can host application programs without a guest operating system. Herein, a "virtual computing instance" is a computing environment created through virtualization, e.g., by a hypervisor; examples of virtual computing instances can include virtual machines and application containers (inclusive of the programs they host, e.g., guest operating systems hosted by virtual machines and applications hosted by guest operating systems and application containers).

Herein, "memory" refers to the computer hardware integrated circuits that store information for immediate use in a computer. Computer memory operates at a relatively high speed, for example random-access memory (RAM), in contrast to storage that provides slow-to-access information but offers higher capacities. Contents of the computer memory can be transferred to storage, through a memory management technique called "virtual memory". Herein, "storage", aka "mass storage" refers to the storage of large amounts of data in a persisting and machine-readable fashion. Devices and/or systems that have been described as storage include tape libraries, RAID systems, and a variety of computer drives such as hard disk drives, magnetic tape drives, magneto-optical disc drives, optical disc drives, memory cards, and solid-state drives. It also includes experimental forms like holographic memory. Storage includes devices with removable and non-removable media. "Storage" does not include random access memory (RAM).

Herein, a "cluster" is the smallest unit of data that can be loaded or stored to storage by an operating system. Cluster size can vary, but is typically 4096 bytes. A "storage cluster" is a cluster stored in physical storage. Herein, a "grain" is a unit of space allocation in a virtual disk, typically comprising more than one cluster. Grains are arranged in order on a virtual disk; thus, each grain can have a unique (to the virtual disk) index corresponding to its order on the virtual disk. Only grains that are in use, e.g., store data, are represented physically in storage. This makes it possible to allocate large amounts of virtual storage to a virtual machine, while limiting the amount of physical storage consumed to the portion of the virtual disk actually used by the virtual machine.

A "grain table" is a table that associates grain indices with grain offsets. Typically, a grain table is stored in storage; the first grain allocated to storage is appended to the grain table and is assigned an offset of zero. Subsequently allocated grains are appended to a previously allocated grain with an offset one greater than the offset of the immediately preceding allocated grain. Grain size can be specified in a grain-table header; a grain size of 16 clusters is typical. A grain-range table is a table that associates one offset for each of plural ranges of one or more grains. Herein, a "grain range" is a sequence of grains with offsets that increment or decrement as a monotonic function of incrementing indices. Herein, "increment" means "increase by unity (1)", while "decrement" means "decrease by unity (1)". Grain tables and grain-range tables are "mutually derivable" in that a grain-range table can be derived from an equivalent grain table and a grain table can be derived from an equivalent grain-range table.

Herein, art labelled "prior art", if any, is admitted prior art. Art not labelled prior art, if any, is not admitted prior art. The illustrated embodiments, as well as variations thereupon and modifications thereto, are provided for by the present invention, the scope of which is defined by the following claims.

What is claimed is:

1. A process comprising:
receiving, from a first virtual computing instance, a first request for access to a first storage cluster of a virtual disk, the first virtual computing instance being hosted by a hypervisor, and wherein the virtual disk is logically divided into a plurality of grains, each grain comprising a plurality of clusters of the virtual disk;
identifying a first grain including the first storage cluster;
determining, using a first in-memory grain-range table, a first storage location of the first grain, wherein the first grain-range table stores an entry for a plurality of grain ranges, wherein each grain-range is a sequence of consecutive grains for which associated offsets vary linearly with associated grain indexes and for which offsets of grain that are adjacent in the sequence differ by one grain; and
fulfilling the first request by providing access to the first location of the first storage cluster within the first grain based on a grain offset for the first grain computed from offset data of the first grain-range table.

2. The process of claim 1 wherein the determining of the first storage location of the first grain includes:
determining a range of the first grain-range table that contains the first grain;
calculating the grain offset for the first grain based on an index value of the first grain and an index value of the start grain for the range containing the first grain in the first grain-range table;
locating a first grain table in storage that includes the first grain; and
using the first grain table to locate the first storage cluster within the first grain.

3. The process of claim 2 wherein the determining the first grain location of the first grain relative to the first grain table includes using a binary search in the first grain-range table to find an offset of the first grain.

4. The process of claim 2 wherein the first grain-range table identifies ranges of grains with monotonically incrementing or decrementing indices and offsets, the indices identifying grains associated with the first grain table and the offsets identifying their respective offsets from the first grain table, the first grain-range table identifying start grains and start offsets for each of the ranges identified by the first grain table.

5. The process of claim 4 wherein each entry in the first grain-range table further provides a direction indication that indicates whether a range of offsets for the entry correspond to an incrementing range or a decrementing range.

6. The process of claim 5 wherein each direction indication is a single bit that indicates, for a respective range of offsets, whether the range is incrementing or decrementing.

7. The process of claim 1 wherein:
the hypervisor receives, from plural virtual computing instances, respective requests for access to respective storage clusters, the plural virtual computing instances being hosted by the hypervisor;
identifying, by the hypervisor, respective grains including the respective storage clusters;
determining, by the hypervisor using a plurality of respective in-memory grain-range tables including the first grain-range table, respective storage locations of the respective grains; and
fulfilling the requests by providing access to the respective locations of the storage clusters within the respective grains.

8. A system comprising non-transitory media encoded with code that, when executed by a processor, implements a process including:
receiving, from a first virtual computing instance, a first request for access to a first storage cluster of a virtual disk, the first virtual computing instance being hosted by a hypervisor, and wherein the virtual disk is logically divided into a plurality of grains, each grain comprising a plurality of clusters of the virtual disk;
identifying a first grain including the first storage cluster;
determining, using a first in-memory grain-range table, a first storage location of the first grain, wherein the first grain-range table stores an entry for a plurality of grain ranges, wherein each grain-range is a sequence of consecutive grains for which associated offsets vary linearly with associated grain indexes and for which offsets of grain that are adjacent in the sequence differ by one grain; and
fulfilling the first request by providing access to the first location of the first storage cluster within the first grain based on a grain offset for the first grain computed from offset data of the first grain-range table.

9. The system of claim 8 wherein the determining of the first storage location of the first grain includes:
determining a range of the first grain-range table that contains the first grain;
calculating the grain offset for the first grain based on an index value of the first grain and an index value of the start grain for the range containing the first grain in the first grain-range table;
locating a first grain table in storage that includes the first grain; and
using the first grain table to locate the first storage cluster within the first grain.

10. The system of claim 9 wherein the determining the first grain location of the first grain relative to the first grain table includes using a binary search in the first grain-range table to find an offset of the first grain.

11. The system of claim 9 wherein the first grain-range table identifies ranges of grains with monotonically incrementing or decrementing indices and offsets, the indices identifying grains associated with the first grain table and the offsets identifying their respective offsets from the first grain table, the first grain-range table identifying start grains and start offsets for each of the ranges identified by the first grain table.

12. The system of claim 11 wherein each entry in the first grain-range table further provides a direction indication that indicates whether a range of offsets for the entry correspond to an incrementing range or a decrementing range.

13. The system of claim 12 wherein each direction indication is a single bit that indicates, for a respective range of offsets, whether the range is incrementing or decrementing.

14. The system of claim 8 wherein:
the hypervisor receives, from plural virtual computing instances, respective requests for access to respective storage clusters, the plural virtual computing instances being hosted by the hypervisor;
identifying, by the hypervisor, respective grains including the respective storage clusters;

determining, by the hypervisor using a plurality of respective in-memory grain-range tables including the first grain-range table, respective storage locations of the respective grains; and fulfilling the requests by providing access to the respective locations of the clusters within the respective grains.

15. A process comprising:

compressing a first grain table by converting the first grain table to a grain-range table, wherein the grain-range table stores an entry for a plurality of grain ranges, wherein each grain-range is a sequence of consecutive grains in the first grain table for which associated offsets vary linearly with associated grain indexes and for which offsets of grain that are adjacent in the sequence differ by one grain;

transferring the grain-range table from a source node to a target node;

expanding the gain-range table into a second grain table that is equivalent to the first grain table and storing the second grain table in storage; and using the second grain table to locate grains stored in the storage.

16. The process of claim 15 wherein the compressing the first grain table to the grain-range table is performed prior to teleporting or otherwise transferring a virtual-machine disk image from the source node to the target node.

17. A system comprising non-transitory media encoded with code that, when executed by a processor, implements a process including:

compressing a first grain table by converting the first grain table to a grain-range table, wherein the grain-range table stores an entry for a plurality of grain ranges, wherein each grain-range is a sequence of consecutive grains in the first grain table for which associated offsets vary linearly with associated grain indexes and for which offsets of grain that are adjacent in the sequence differ by one grain;

transferring the grain-range table from a source node to a target node;

expanding gain-range table into a second grain table that is equivalent to the first grain table and storing the second grain table in storage; and using the second grain table to locate grains stored in the storage.

18. The system of claim 17 wherein the compressing the first grain table to the grain-range table is performed prior to teleporting or otherwise transferring a virtual-machine disk image from the source node to the target node.

* * * * *